(12) United States Patent
Hagan et al.

(10) Patent No.: US 10,787,154 B2
(45) Date of Patent: Sep. 29, 2020

(54) WINDSHIELD DEFROSTER WITH SECONDARY DUCTED OUTLET

(71) Applicant: FORD GLOBAL TECHNOLOGIES, LLC, Dearborn, MI (US)

(72) Inventors: Keith A. Hagan, Madison Heights, MI (US); Richard Matthew Noseda, Harper Woods, MI (US); Amir Jahany Fard, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/258,004

(22) Filed: Sep. 7, 2016

(65) Prior Publication Data
US 2018/0065601 A1   Mar. 8, 2018

(51) Int. Cl.
*B60S 1/54* (2006.01)
*B60H 1/00* (2006.01)

(52) U.S. Cl.
CPC ............ *B60S 1/54* (2013.01); *B60H 1/00564* (2013.01)

(58) Field of Classification Search
CPC ........................................................ B60S 1/54
USPC ......................................................... 454/124
See application file for complete search history.

(56) References Cited

U.S. PATENT DOCUMENTS

| | | | | |
|---|---|---|---|---|
| 2,016,019 A | * | 10/1935 | Muvrin | B60S 1/54 454/123 |
| 3,313,915 A | * | 4/1967 | Chamberlain, Jr. | B60S 1/54 392/347 |
| 3,747,500 A | | 7/1973 | Redd | |
| 4,223,754 A | * | 9/1980 | Mizuno | B60H 1/00035 180/90 |
| 4,549,471 A | | 10/1985 | Kochy et al. | |
| 4,637,298 A | * | 1/1987 | Yoshikawa | B60H 1/3407 454/127 |
| 4,741,258 A | * | 5/1988 | Trube | B60H 1/242 454/127 |
| 4,766,805 A | * | 8/1988 | Sato | B60H 1/242 454/127 |
| 5,113,748 A | * | 5/1992 | Shibuya | B60S 1/54 454/121 |
| 5,556,153 A | | 9/1996 | Kelman et al. | |
| 5,706,170 A | * | 1/1998 | Glovatsky | B60H 1/0055 361/695 |

(Continued)

FOREIGN PATENT DOCUMENTS

EP    0458705 A2    11/1991

*Primary Examiner* — Steven B McAllister
*Assistant Examiner* — Allen R Schult
(74) *Attorney, Agent, or Firm* — David Coppiellie; King & Schickli, PLLC

(57) ABSTRACT

A vehicle defroster includes an inlet for receiving an air flow, a wall dividing the air flow into a primary airflow and a secondary airflow, a primary duct guiding the primary airflow out a primary outlet onto a first portion of a windshield, and a secondary duct guiding the secondary airflow out a secondary outlet onto a second portion of the windshield. The defroster may include a primary chamber receiving the primary airflow and a secondary chamber receiving the secondary airflow. The primary chamber may be formed by a front section and a rear section. The wall may include a proportioning member, and the proportioning member may extend toward the primary chamber.

10 Claims, 4 Drawing Sheets

(56) References Cited

U.S. PATENT DOCUMENTS

| | | | |
|---|---|---|---|
| 6,192,698 B1* | 2/2001 | Kakehashi | B60H 1/00064 |
| | | | 165/203 |
| 6,382,712 B1* | 5/2002 | Bruss | B60H 1/242 |
| | | | 296/190.09 |
| 8,449,013 B2 | 5/2013 | Carter | |
| 8,591,299 B2 | 11/2013 | DiGasbarro | |
| 2004/0214517 A1 | 10/2004 | Dietze et al. | |
| 2010/0224253 A1* | 9/2010 | Azar | B60H 1/00678 |
| | | | 137/1 |

\* cited by examiner

WINDSHIELD DEFROSTER WITH SECONDARY DUCTED OUTLET

TECHNICAL FIELD

This document relates generally to vehicle air ducts, and more specifically to a windshield defroster and secondary ducted outlet.

BACKGROUND

Vehicles incorporate air distribution systems for moving air through heating and cooling systems in order to heat and/or cool a passenger compartment. The air is warmed or cooled and blown through vents into the passenger compartment. Traditionally, a limited number of vents were positioned within the instrument panel. The vents included louvres for directing air toward passengers and/or windows.

In addition, it is known to duct air to and distribute over an interior surface of a windshield to defog or clear condensation and thaw frost from the windshield and side windows. The ducted air is generally heated by the vehicle's engine coolant via a heater core. Fresh air is blown through the heater core and then ducted to and distributed over the interior surface of the windshield by a blower. This air is in many cases first dehumidified by passing it through the vehicle's operating air conditioning evaporator. Such dehumidification makes the defogger/defroster more effective and faster, for the dried air has a greater capacity to absorb water from the glass at which it is directed.

In some vehicles, however, the ducted air is unable to be distributed or outlet over an entire interior surface of the windshield. This is often due to a limited amount of space in front of the driver or certain features mounted on a top surface of the instrument panel (e.g., a heads-up display) obstructing defroster outlet flow and/or preventing it from reaching an outboard edge of the windshield. The resulting visual obstructions are undesirable for proper operation of the vehicle.

Prior attempts to overcome such obstructions include electrically heated windshields, which require significant additional cost to the windshield and the vehicle's electrical system, and utilization of a secondary duct and outlet located on the top surface of the instrument panel. The latter situation suffers from two particular drawbacks. First, air flow for the secondary duct is provided from a primary outlet rather than the vehicle's air distribution system. The primary outlet has insufficient available pressure to efficiently supply a secondary outlet. Second, the introduction of a secondary duct and outlet often requires the primary duct to be shortened to provide package space for an air tight joint between the primary and secondary ducts which can negatively impact an outboard throw of air flow affecting an overall ability to clear the windshield.

Accordingly, a need is identified for a defroster having a secondary ducted outlet having sufficient air flow pressure to efficiently defrost an outboard edge of a windshield. To ensure sufficient air flow, the secondary duct receives air flow from the same inlet as a primary duct to maximize available pressure. Such a defroster is preferably located beneath a top surface of the instrument panel and may include integral side window passages for defrosting side windows. Since air flow for both the primary and secondary ducts is taken from the same inlet and air flow needs vary from one vehicle to another, the defroster should allow an amount of air flow into each duct to be proportioned.

SUMMARY OF THE INVENTION

In accordance with the purposes and benefits described herein, a vehicle defroster is provided. The defroster may be broadly described as including an inlet for receiving an air flow, a wall dividing the air flow into a primary airflow and a secondary airflow, a primary duct guiding the primary airflow out a primary outlet onto a first portion of a windshield, and a secondary duct guiding the secondary airflow out a secondary outlet onto a second portion of the windshield.

In another possible embodiment, the second portion of the windshield includes an outboard edge of a driver's side of the windshield.

In still another possible embodiment, the defroster includes a primary chamber receiving the primary airflow and a secondary chamber receiving the secondary airflow. In another, the primary chamber is formed by a front section and a rear section.

In yet another possible embodiment, the wall includes a proportioning member. In still another, the proportioning member extends toward the primary chamber.

In still yet another possible embodiment, the defroster includes a first section and a second section forming a primary chamber.

In one additional possible embodiment, the first section and the second section form a tertiary duct guiding a tertiary portion of the air flow toward a side window. In another, the defroster includes a proportioning member.

In one other possible embodiment a defroster includes an inlet for receiving an air flow, at least two sections forming a primary chamber, a wall dividing the air flow into a primary airflow through the primary chamber and a secondary airflow through a secondary chamber, a primary duct guiding the primary airflow out a primary outlet onto a first portion of a windshield, and a secondary duct guiding the secondary airflow out a secondary outlet onto a second portion of the windshield.

In another possible embodiment, the wall includes a proportioning member. In still another, the proportioning member extends toward the primary chamber. In yet another, the proportioning member is scallop shaped.

In yet another possible embodiment, the at least two sections further form at least one side window defrost duct.

In one other possible embodiment a defroster includes an inlet for receiving an air flow, first and second sections forming a primary chamber, a wall dividing the air flow into a primary airflow through the primary chamber and a secondary airflow through a secondary chamber, a primary duct guiding the primary airflow from the primary chamber out a primary outlet onto a first portion of a windshield, and a secondary duct guiding the secondary airflow from the secondary chamber out a secondary outlet onto a second portion of the windshield.

In another possible embodiment, the defroster includes a tertiary duct guiding a tertiary airflow toward a side window.

In still another possible embodiment, the defroster includes a proportioning member for proportioning the air flow into the primary airflow and the secondary airflow. In yet another, the proportioning member extends from and is centrally positioned along the wall.

In one other possible embodiment, the defroster includes first and second sections which form a primary chamber through which the primary airflow travels, a driver side window duct, and a passenger side window duct.

A vehicle incorporating any of the defrosters described above.

In the following description, there are shown and described several embodiments of a windshield defroster. As it should be realized, the invention is capable of other, different embodiments and its several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the windshield defroster and together with the description serve to explain certain principles thereof. In the drawing figures.

Reference will now be made in detail to the present preferred embodiments of the windshield defroster, examples of which are illustrated in the accompanying drawing figures, wherein like numerals are used to represent like elements.

DETAILED DESCRIPTION

Figure 1:
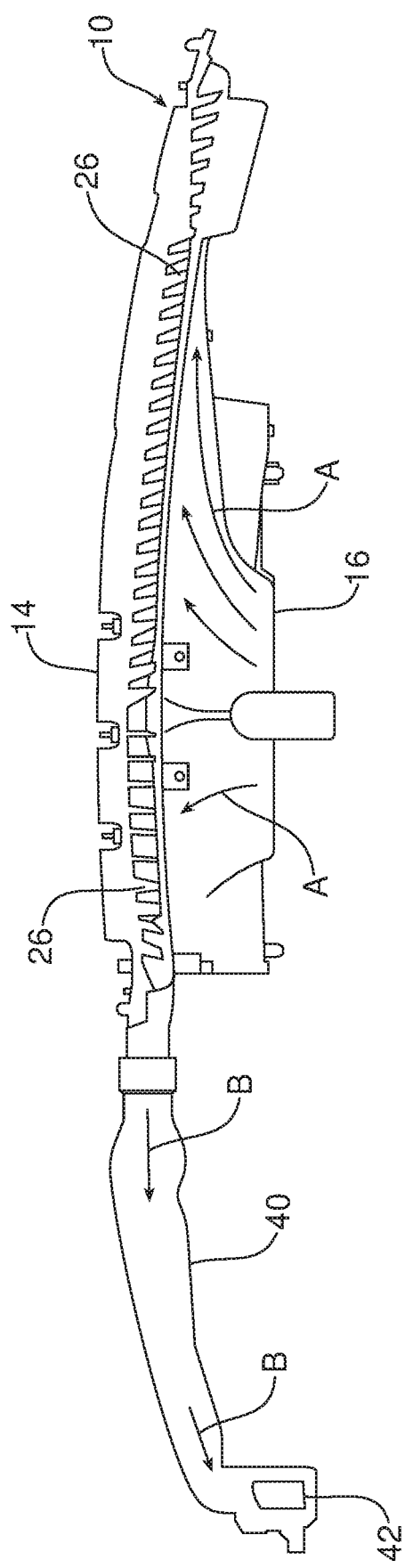
FIG. 1 is a bottom plan view of a defroster and secondary duct extending therefrom.

Reference is now made to FIG. 1 which illustrates a defroster 10 for a vehicle. In the described embodiment, an airflow is received through an inlet 12 from a heating, ventilation, and air conditioning unit (not shown). The inlet 12 is formed by a first section 14 and a second section 16 which together form a primary chamber 18. The first section 14 is a front section positioned closer to a windshield, i.e., a front end of a vehicle, and the second section 16 is a rear section positioned farther away from the windshield toward a rear end of the vehicle. A wall 20 divides the airflow entering the inlet 12 into a primary airflow and a secondary airflow. Both the primary airflow and the secondary airflow have a maximum available pressure and enter the primary chamber 18 and a secondary chamber 22 in relatively the same manner.

Figure 3:
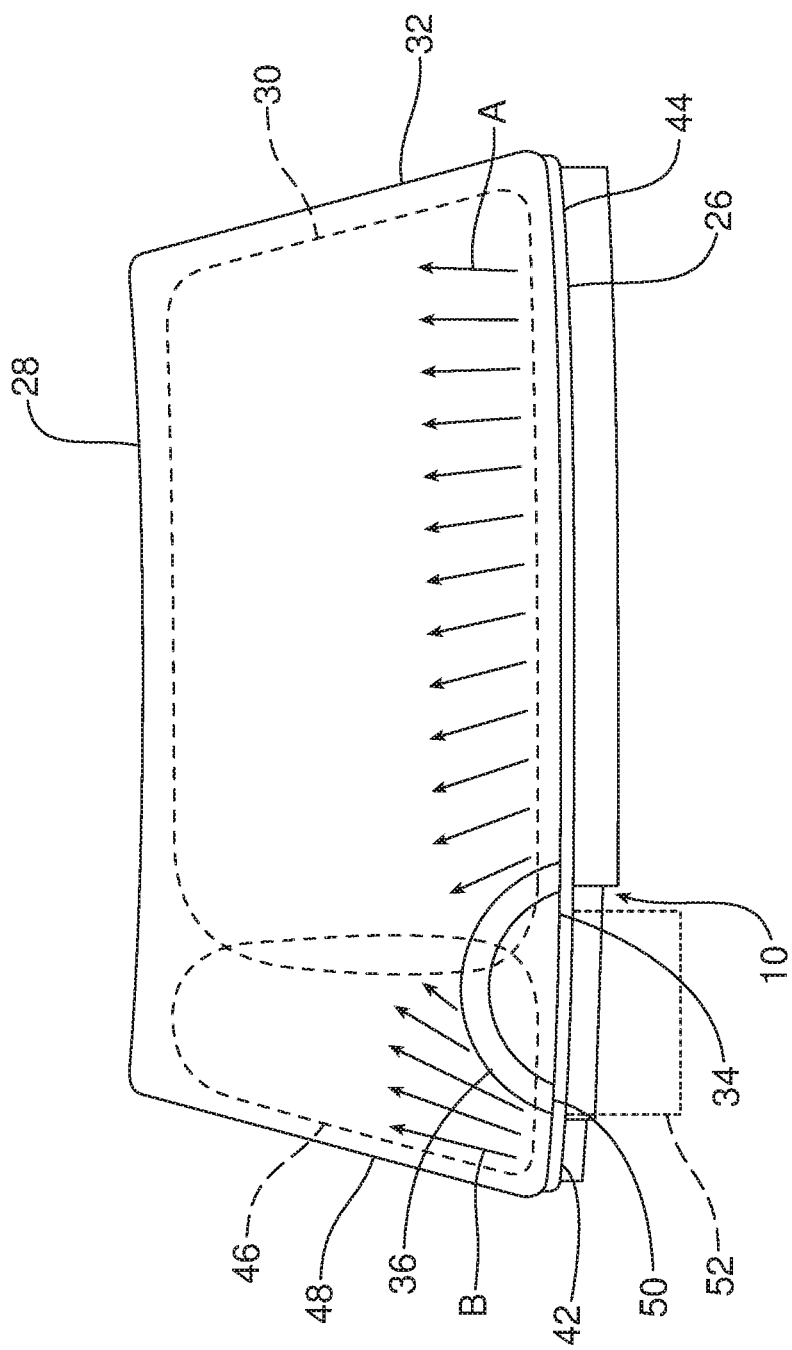
FIG. 3 is a partial view of a vehicle windshield and defroster.

The primary airflow (shown by action arrows A in FIG. 1) enters the primary chamber 18 and is guided through a primary duct 24 and out a primary outlet 26 onto a windshield 28. As best shown in FIG. 3, the primary outlet 26 outlets the primary air flow onto a portion of the windshield. In the described embodiment, the primary airflow is outlet onto a portion 30 of the windshield extending from a passenger side edge 32 of the windshield to an area 34 generally near a steering wheel 36 on the driver side.

The secondary airflow (shown by action arrows B in FIG. 2) enters the secondary chamber 22 formed by a third section 38 and is guided through a secondary duct 40 and out a secondary outlet 42 onto the windshield 28. The secondary duct 40 extends from the secondary chamber 22, beneath the instrument panel 44, and outlets the secondary airflow onto a second portion 46 of the windshield 28 as shown by action arrow B in FIG. 3. In the described embodiment, the secondary airflow is outlet onto the portion of the windshield extending from a driver side edge 48 of the windshield to an area 50 generally near the steering wheel A gap where the primary and secondary outlets 26 and 42 are unable to outlet airflow onto the windshield 28, if any, depends on the features mounted on a top surface of the instrument panel 44. For example, the primary outlet 26 adjacent the first portion of the windshield 30 could extend from the passenger side edge 32 of the windshield to a passenger side edge of a heads-up display 52 while the secondary outlet 42 adjacent the second portion of the windshield 46 could extend from the driver side edge 48 of the windshield to a driver side edge of the heads-up display. The gap between the primary outlet 26 and the secondary outlet 42 behind the heads-up display 52 depends on the size of the heads-up display or other obstructing feature. However, the defroster's dual port arrangement eliminates, or at least substantially eliminates, any gaps in airflow reaching the windshield 28. More specifically, the primary and secondary airflows outlet onto the first portion 30 of the windshield and the second portion 46 of the windshield 28 should overlap as shown in FIG. 3 thus at least substantially eliminating any gaps in airflow onto the windshield.

Figure 4:
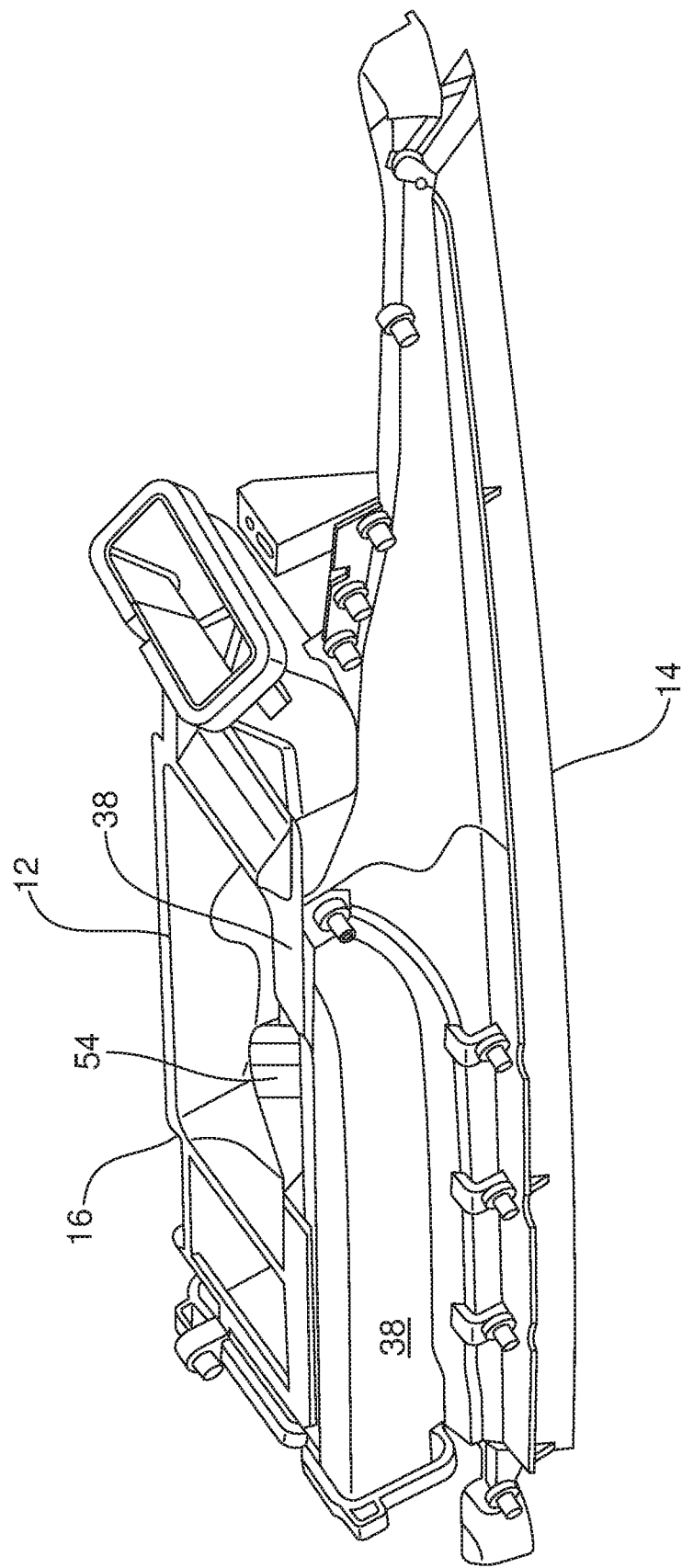
FIG. 4 is a perspective view of the defroster illustrating the chambers and proportioning feature.

Returning to FIG. 2, the wall 20 dividing the inlet airflow forms a part of the front section 14 and, in the described embodiment, is tunable to proportion a flow rate of the secondary airflow to a flow rate of the primary airflow. More specifically, the wall 20 includes a proportioning member 54 that extends toward the primary chamber 18. As best shown in FIG. 4, the proportioning member 54 is a generally scalloped shaped feature and is centrally positioned along the wall 20 to optimize a cross section area taken by the secondary chamber 22 at the inlet 12. Centrally locating the proportioning member 54 also helps shape an outlet rate or velocity profile of the primary outlet 26.

As is known in the art, the center of a defroster outlet is at times purposefully restricted by shape and/or other features to assist in promoting a vertical airflow from a heating, ventilation, and air conditioning unit to distribute outboard. Even more, the scalloped shaped member 54 in the described embodiment is dimensionally proportioned to minimize an effect of variation in relative position between the defroster inlet 22 and the heating, ventilation, and air conditioning unit making the design more robust to exposing too much or too little of the secondary inlet flow cross section due to build variation.

Figure 2:
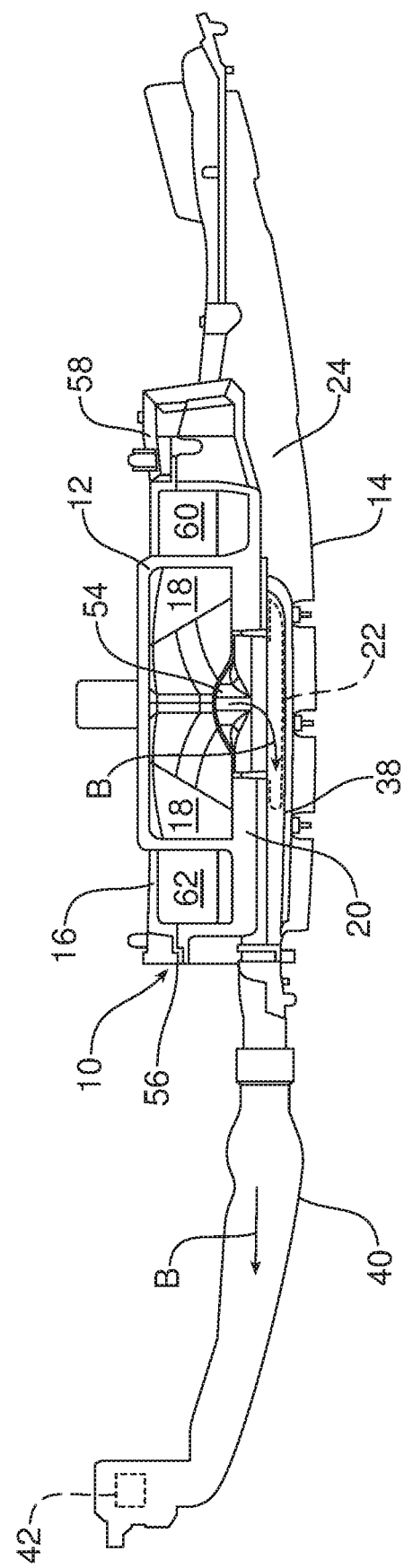
FIG. 2 is a top plan view of the defroster and secondary duct.

As further shown in FIG. 2, the defroster 10 includes two side window defrost ducts 56, 58. In the described embodiment, the first and second sections 14, 16 form a tertiary chamber 62 through which air flows to a passenger side air duct outlet 56 and a quaternary chamber 60 through which air flows to a driver side air duct outlet 58. Although not shown, air ducts connect to the passenger side and driver side air duct outlets 56, 58 and guide air to passenger side and driver side window outlets. Utilization of the first and second sections 14, 16 to form the additional chambers 60, 62 allows for efficient packaging within the instrument panel. Again, airflow for the two side window defrost ducts is taken at the inlet 12 to ensure a maximum available airflow pressure.

In summary, numerous benefits result from the utilization of the defroster 10 a defroster having a secondary ducted outlet with sufficient airflow pressure to efficiently defrost an outboard edge of a windshield as illustrated in this document. To ensure sufficient air flow, the secondary duct receives air flow from the same inlet as a primary duct to maximize available pressure. Such a defroster is preferably located beneath a top surface of the instrument panel and may include integral side window passages for defrosting side windows.

The foregoing has been presented for purposes of illustration and description. It is not intended to be exhaustive or to limit the embodiments to the precise form disclosed. Obvious modifications and variations are possible in light of the above teachings. For example, the windshield defroster may allow an amount of air flow into each duct to be proportioned utilized a proportioning feature. All such modifications and variations are within the scope of the appended claims when interpreted in accordance with the breadth to which they are fairly, legally and equitably entitled.

What is claimed:

1. A defroster, comprising:
    an inlet for receiving an air flow;
    at least two sections, a first section of the at least two sections attached to a second section of the at least two sections such that the first and second sections of the at least two sections define the inlet and a primary chamber;
    a wall dividing the air flow entering the inlet into a primary airflow through said primary chamber and a secondary airflow through a secondary chamber, wherein a central portion of said wall curves toward the primary chamber to optimize a cross section area taken by the secondary chamber at the inlet, such that an airflow volume of the primary airflow and an airflow volume of the secondary airflow are different;
    a primary duct guiding the primary airflow out a primary outlet onto a first portion of a windshield extending from a passenger side edge of the windshield to a first area in line with a steering wheel in a longitudinal direction of the vehicle; and
    a secondary duct guiding the secondary airflow out a secondary outlet onto a second portion of said windshield extending from a driver side edge of the windshield to a second area in line with the steering wheel in the longitudinal direction of the vehicle.

2. The defroster of claim 1, wherein said at least two sections further form at least one side window defrost duct.

3. A defroster, comprising:
    an inlet for receiving an air flow;
    first and second sections, the first section attached to the second section such that the first and second sections define the inlet and a primary chamber;
    a wall dividing the entering the inlet air flow into a primary airflow through said primary chamber and a secondary airflow through a secondary chamber, wherein a central portion of said wall curves toward the primary chamber to optimize a cross section area taken by the secondary chamber at the inlet, such that an airflow volume of the primary airflow and an airflow volume of the secondary airflow are different;
    a primary duct guiding the primary airflow from said primary chamber out a primary outlet onto a first portion of a windshield extending from a passenger side edge of the windshield to a first area in line with a steering wheel in a longitudinal direction of the vehicle;
    a secondary duct guiding the secondary airflow from said secondary chamber out a secondary outlet onto a second portion of said windshield extending from a driver side edge of the windshield to a second area in line with the steering wheel in the longitudinal direction of the vehicle; and
    a tertiary duct guiding a tertiary airflow toward a side window.

4. The defroster of claim 3, wherein said central portion of the wall curving toward the primary chamber proportions the air flow into the primary airflow and the secondary airflow.

5. The defroster of claim 3, wherein the tertiary duct is one of a driver side window duct and a passenger side window duct.

6. A defroster, comprising:
    a first section attached to a second section;
    an inlet for receiving an air flow, the inlet defined by the first and the second sections;
    a wall extending from the first section divides the air flow entering the inlet into a primary airflow and a secondary airflow;
    a primary chamber receiving the primary airflow and a secondary chamber receiving the secondary airflow, wherein a central portion of said wall curves toward the primary chamber to optimize a cross section area taken by the secondary chamber at the inlet, such that an airflow volume of the primary airflow and an airflow volume of the secondary airflow are different;
    a primary duct guiding the primary airflow out a primary outlet onto a first portion of a windshield, said first portion of the windshield extends from a passenger side edge of the windshield to a first area in line with a steering wheel in a longitudinal direction of the vehicle; and
    a secondary duct guiding the secondary airflow out a secondary outlet onto a second portion of said windshield, said second portion extends from a driver side edge of the windshield to a second area in line with the steering wheel in the longitudinal direction of the vehicle, wherein the first portion and the second portion of the windshield overlap to eliminate any gaps in the primary airflow and secondary airflow onto the windshield.

7. The defroster of claim 6, wherein said primary chamber is defined by the first section and the second section.

8. The defroster of claim 6, wherein said central portion of said wall extends toward the second section.

9. The defroster of claim 6, wherein said first section and said second section define a tertiary duct guiding a tertiary portion of the air flow toward a side window.

10. A vehicle incorporating the defroster of claim 6.

* * * * *